(12) United States Patent
Ohara

(10) Patent No.: US 6,286,070 B1
(45) Date of Patent: Sep. 4, 2001

(54) SHARED MEMORY ACCESS DEVICE AND METHOD

(75) Inventor: Kunihiro Ohara, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/257,040

(22) Filed: Feb. 25, 1999

(30) Foreign Application Priority Data

Jul. 27, 1998 (JP) .................................................. 10-211391

(51) Int. Cl.$^7$ ............................ G06F 13/36; G06F 13/362
(52) U.S. Cl. .......................... 710/113; 710/240; 710/241; 710/244; 710/107; 710/112; 710/114; 710/115; 710/116; 710/117; 710/118
(58) Field of Search ............................ 710/113–118, 240, 710/241, 244, 107, 112

(56) References Cited

U.S. PATENT DOCUMENTS 4,987,529 * 1/1991 Craft et al. ............................ 710/113
5,191,656 * 3/1993 Forde, III et al. ..................... 710/107
5,784,582 * 7/1998 Hughes ................................. 710/117

FOREIGN PATENT DOCUMENTS 4-148453    5/1992 (JP) .

* cited by examiner

Primary Examiner—Rupal Dharia
(74) Attorney, Agent, or Firm—Staas & Halsey LLP

(57) ABSTRACT

A bus controller for a CCD digital still camera arbitrates competing requests by multiple microcontrollers for a shared memory. One of the microcontrollers is designated to have a higher priority than the other microcontroller(s). In the case of competing requests, while one microcontroller is granted access to the memory, the other microcontroller performs other processing, and polls a memory status register to determine when the memory is available. Since the waiting processor performs other operations, as opposed to idling, the efficiency of the microcontroller is improved.

8 Claims, 5 Drawing Sheets

[1]: READ INSTRUCTION TO SDRAM
[2]: OTHER PROCESSING
[3]: OTHER PROCESSING
[4]: POLLING
[5]: OTHER PROCESSING
[6]: OTHER PROCESSING
[7]: OTHER PROCESSING
[8]: OTHER PROCESSING
[9]: POLLING
[10]: READ INSTRUCTION TO DATA BUFFER

SHARED MEMORY ACCESS DEVICE AND METHOD

BACKGROUND OF THE INVENTION

The present invention generally relates to a bus controller, and, more particularly, to a bus controller for arbitrating access requests of a plurality of microcontrollers to a shared memory.

A bus controller is provided between a plurality of microcontrollers and a memory. The bus controller arbitrates access requests from respective microcontrollers to the shared memory and generally sequentially provides access authority to the microcontroller having a highest priority. The bus controller provides a bus wait signal to the microcontrollers having a lower priority. The microcontrollers having the lower priority wait until the processing operation of the microcontroller having the higher priority terminates, at which time the bus controller again determines which microcontroller will be granted access to the memory.

FIG. 1 is a schematic block diagram of a conventional bus controller. A memory controller (bus controller) 50 is connected to first and second microcontrollers 51 and 52 via CPU buses 53 and 54. Each of the microcontrollers 51 and 52 supplies an access signal such as a read instruction or a write instruction to the memory controller 50. Now, assume the first microcontroller 51 has a higher priority than the second microcontroller 52. When the access requests are made from the first and second microcontrollers 51 and 52 to the memory controller 50, the memory controller 50 controls a memory 55 in accordance with the access request from the first microcontroller 51. For example, the memory controller 50 reads data from the memory 55 in accordance with a read access request of the first microcontroller 51 and temporarily stores the data in a data buffer 50a and then supplies the stored data to the first microcontroller 51 via the CPU bus 53. The memory controller 50 further lowers a bus wait signal RDY supplied to the second microcontroller 52 from an H level (high potential or logical value "1") to an L level (low potential or logical value "0"). The second microcontroller 52 waits in response to the bus wait signal RDY low.

FIG. 2 is a timing chart explaining the operation of the memory controller 50 and the second microcontroller 52. The memory controller 50 receives a read signal RD low for a read operation supplied from the second microcontroller 52 and in return, supplies the bus wait signal RDY low to the second microcontroller 52. The second microcontroller 52 supplies the read instruction to the memory controller 50 and waits.

When the transfer of the data read from the memory 55 to the first microcontroller 51 has terminated, the memory controller 50 then controls the memory 55 in accordance with the read instruction from the second microcontroller 52. At this time, the memory controller 50 raises the bus wait signal RDY from an L level to an H level. The second microcontroller 52 resets the wait state in response to the bus wait signal RDY high and receives read data from the data buffer 50a. The second microcontroller 52 cannot receive read data from the data buffer 50a while it is waiting. As a result, the efficiency of the second microcontroller 52 is reduced. In particular, when an access request is made from another microcontroller having a higher priority than the second microcontroller 52 while the second microcontroller 52 is waiting, the wait time of the second microcontroller 52 is prolonged, such that it may enter a bus locked state.

It is an object of the present invention to provide a bus controller that improves the processing efficiency of microcontrollers.

SUMMARY OF THE INVENTION

In one aspect of the present invention, a method is provided that arbitrate access requests to a shared memory from a plurality of controllers including a first controller and a second controller having a lower access priority than the first controller. First, an operation mode of the second controller is set in one of a wait mode and a non-wait mode. Then, the access enabling of the first controller and the access disabling of the second controller are decided in accordance with access priority when the access requests from the first and second controllers compete with each other. Then, a first signal for resetting a wait state for the first controller is supplied a second signal for resetting a wait state for the second controller is supplied when the second controller is set in the non-wait mode.

In another aspect of the present invention, a bus controller is provided that arbitrate access requests to a shared memory from a plurality of controllers including a first controller and a second controller having a lower access priority than the first controller. The bus controller includes a first register for storing one of wait mode data and non-wait mode data set for the second controller. An arbitration circuit is connected to the first and second controllers, receives access requests from the first and second controllers, decides the access enabling of the first controller, and decides the access disabling of the second controller when the access requests from the first and second controllers compete with each other. A first bus access controller is connected to the arbitration circuit and supplies a first signal for resetting the wait state of the first controller in accordance with the decision of the access enabling of the first controller. A second bus access controller is connected to the first register and the arbitration circuit and supplies a second signal for resetting the wait state of the second controller when the access disabling of the second controller is determined and the non-wait mode data is stored in the first register.

In yet another aspect of the invention, an electronic device is provided that includes a plurality of controllers including first and second controllers and a memory shared by the plurality of controllers. The second controller has a lower access priority than the first controller. A bus controller is connected between the plurality of controllers and the memory and arbitrate access requests to the shared memory from the plurality of controllers. The bus controller includes a first register for storing one of wait mode data and non-wait mode data set for the second controller. An arbitration circuit is connected to the plurality of controllers for receiving access requests from the first and second controllers and decides the access enabling of the first controller and access disabling of the second controller when the access requests from the first and second controllers compete with each other. A first bus access controller is connected to the arbitration circuit and supplies a first signal for resetting a wait state of the first controller in accordance with the decision of the access enabling of the first controller. A second bus access controller is connected to the first register and the arbitration circuit and supplies a second signal for resetting the wait state of the second controller when the access disabling to the second controller is determined and the non-wait mode data is stored in the first register.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
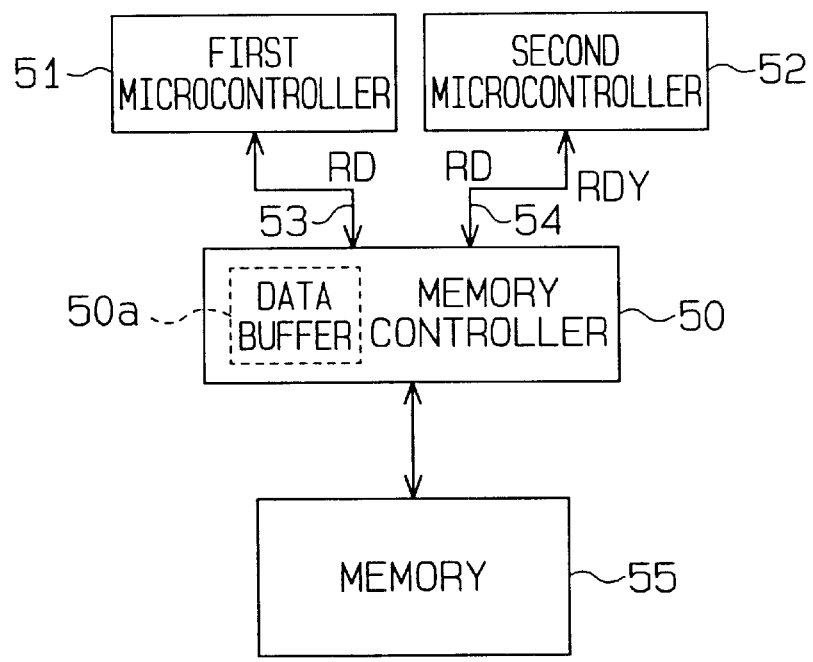
FIG. 1 is a schematic block diagram of a conventional bus controller.
Figure 2:
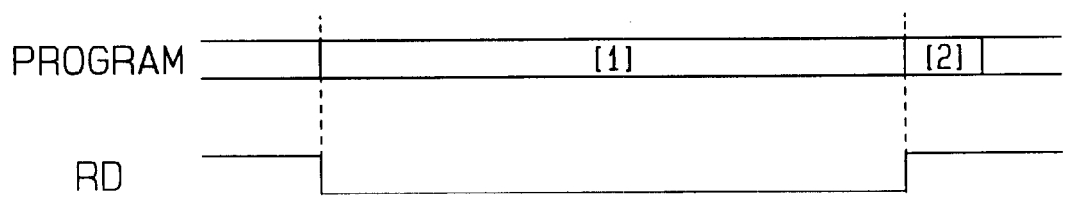
FIG. 2 is a timing chart explaining the operation of a bus controller and a microcontroller.
Figure 3:
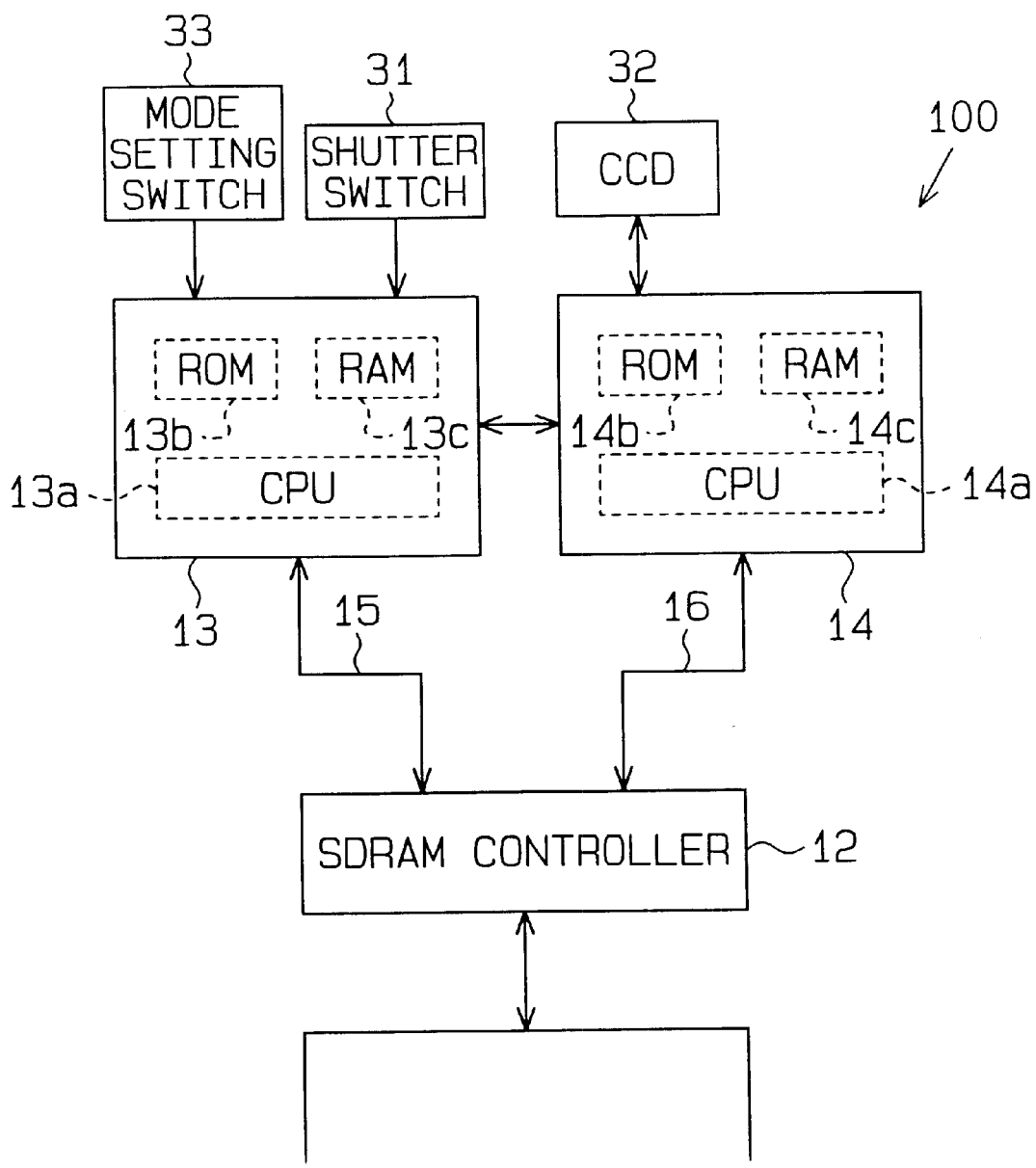
FIG. 3 is a schematic block diagram of a digital still camera including a bus controller according to a first embodiment of the present invention.

A first embodiment in which the present invention is embodied into a digital still camera is described in accordance with the drawings. FIG. 3 is a schematic block diagram of a digital still camera 100. The digital still camera 100 includes a synchronous dynamic random access memory (SDRAM) 11, an SDRAM controller 12 (bus controller), a main controller 13, an external controller 14, a shutter switch 31, a CCD 32, and a mode setting switch 33. The SDRAM controller 12 is connected to the main controller 13 and the external controller 14 via first and second CPU buses 15 and 16, respectively. The SDRAM controller 12 arbitrates access requests for the SDRAM 11 from the main controller 13 and the external controller 14 and sequentially gives access authority to the controller having the higher priority. In the first embodiment, the external controller 14 has a higher priority than the main controller 13. Instead of the SDRAM 11, for example, a memory such as a dynamic random access memory (DRAM) may be used.

Figure 4:
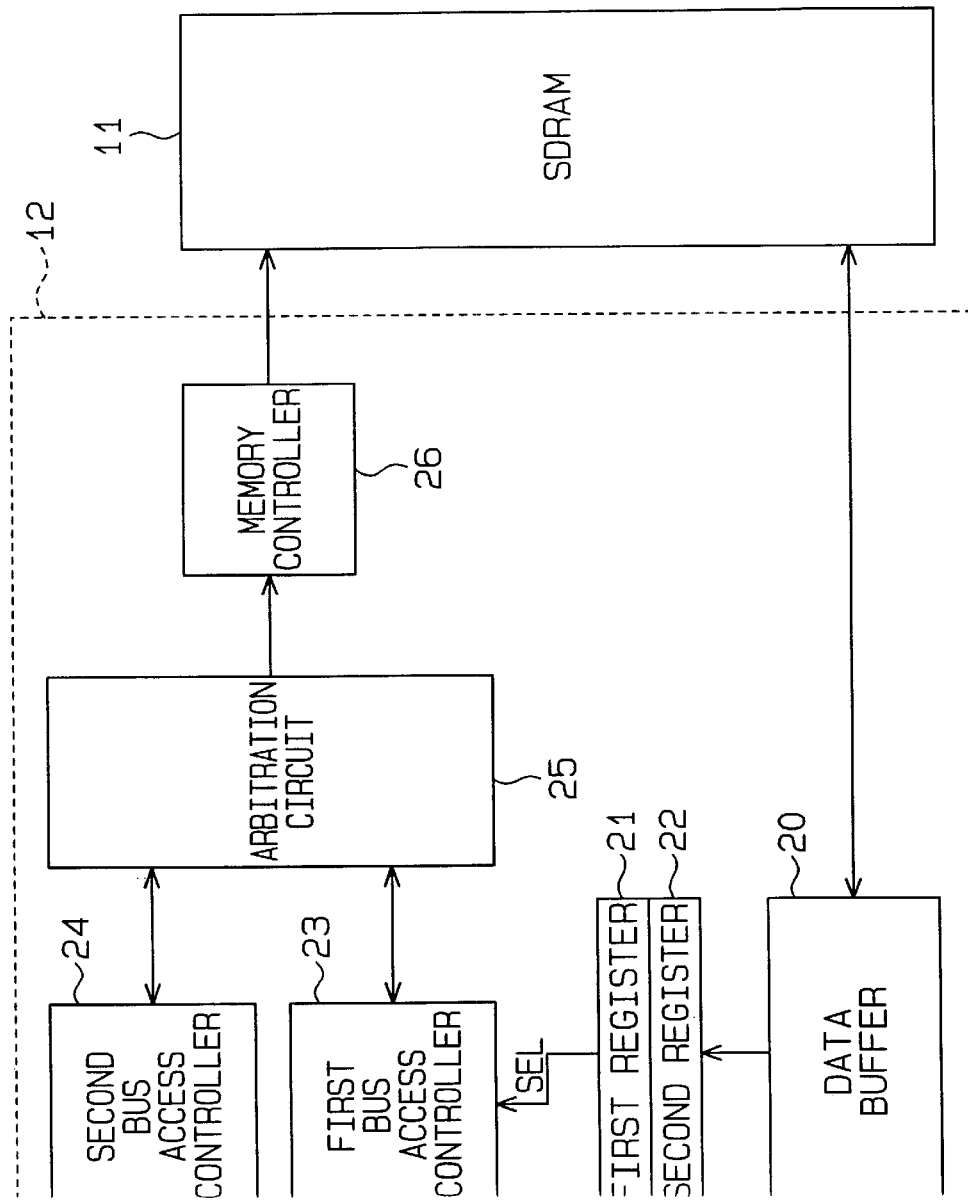
FIG. 4 is a schematic block diagram of the SDRAM controller (bus controller) of the digital still camera of FIG. 3.

FIG. 4 is a schematic block diagram of the SDRAM controller 12. The SDRAM controller 12 is preferably a single semiconductor integrated circuit device. The SDRAM controller 12 includes a data buffer 20, a first register (wait/non-wait data holding circuit) 21, a second register 22 (operating status data holding circuit), first and second bus access controllers 23 and 24, an arbitration circuit 25, and a memory controller 26.

The data buffer 20 is connected to the main and external controllers 13 and 14 via the CPU buses 15 and 16. The data buffer 20 is further connected to the SDRAM 11 via an internal bus (not shown). The data buffer 20 temporarily holds write data supplied from the main and external controllers 13, 14 and temporarily stores the read data read from the SDRAM 11. The temporarily stored read data is supplied to the main or external controller 13 or 14 via the CPU buses 15 and 16. The data buffer 20 may be connected only to the main controller 13 via the CPU bus 15. In this case, the data buffer 20 is used only for the main controller 13, and data transfer between the external controller 14 and the SDRAM 11 is performed without the data buffer. Conversely, the data buffer 20 may be connected only to the external controller 14 via the CPU bus 16.

The first register 21 receives mode data SEL from the main controller 13 via the CPU bus 15 and temporarily stores the mode data SEL. The mode data SEL includes the wait mode data having a logical value "0" and the non-wait mode data having a logical value "1". The wait mode data indicates that the main controller 13, having the lower priority, enters the wait state when the access request of the external controller 14, having the higher priority, is selected. The non-wait mode data indicates that the main controller 13 enters the state, which allows other processing to be executed, instead of the wait state.

The second register 22 temporarily stores operating status data FLG from the data buffer 20. The operating status data FLG is the logical value "0" or the logical value "1". The operating status data FLG "0" (flag "0") indicates that data is being transferred between the SDRAM 11 and the data buffer 20 and between the external controller 14 and the data buffer 20. Conversely, the operating status data FLG "1" (flag "1") indicates that data is not being transferred.

The data buffer 20 writes the logical value "0" to the second register 22 until the transfer of write data to the SDRAM 11 is completed from the main or external controller 13 or 14 via the data buffer 20. When the data transfer is completed, the data buffer 20 then writes the logical value "1" to the second register 22. The data buffer 20 further writes the logical value "0" to the second register 22 until the transfer of read data to the main or external controller 13 or 14 from the SDRAM 11 via the data buffer 20 is completed. When the data transfer is completed, the data buffer 20 then writes the logical value "1" to the first register 22.

The main controller 13 receives the operating status data FLG stored in the second register 22 via the CPU bus 15 and determines the operating status of the data buffer 20 based on the data FLG. In other words, the main controller 13 determines whether the access request of the external controller 14 is terminated or made to wait based on the data FLG or whether access to the SDRAM 11 is enabled.

The first bus access controller 23 receives the access information that include a read signal RD and read address data or a write signal WR and write address data, from the main controller 13 via the CPU bus 15 and temporarily holds the access information and supplies an access request signal to the arbitration circuit 25.

The bus access controller 23 further enters the wait mode in accordance with the wait mode data SEL "0" stored in the first register 21. When the first bus access controller 23 enters the wait mode, the controller 23 supplies the bus wait signal RDY low to the main controller 13. Accordingly, the main controller 13 enters the wait state. The first bus access controller 23 further holds the access information until an access enabling signal is supplied from the arbitration circuit 25 (that is, while an access disabling signal is being supplied). The first bus controller 23 supplies the access information to the arbitration circuit 25 in response to the access enabling signal and supplies the bus wait signal RDY high to the main controller 13. The main controller 13 resets the wait state in response to the bus wait signal RDY high and moves to the next instruction processing operation.

The first bus access controller 23 enters the non-wait mode in accordance with the non-wait mode data SEL "1" stored in the first register 21. When the first bus access controller 23 enters the non-wait mode, the controller 23 maintains the bus wait signal RDY high to the main controller 13. Accordingly, the main controller does not enter the wait state. In the non-wait mode, the first bus access controller 23 holds the access information until the access enabling signal is supplied from the arbitration circuit 25. Accordingly, the main controller 13 jumps to other processing and executes the processing of the jump destination even when access to the SDRAM 11 is not allowed. As a result, the wait time of the main controller 13 is shortened, and the main controller 13 performs its processing operations efficiently.

The second bus controller 24 receives the access information from the external controller 14 via the CPU bus 16 and temporarily holds the access information and supplies an access request signal to the arbitration circuit 25. The second bus access controller 24 holds the access information until the access enabling signal is supplied from the arbitration circuit 25. The second bus access controller 24 further supplies the bus wait signal RDY high to the external controller 14 in response to the access enabling signal. The external controller 14 resets the wait state in response to the bus wait signal RDY high and executes the next instruction processing operation.

The arbitration circuit 25 receives the access request signal from the first and second bus access controllers 21 and 22 and supplies the access enabling signal to the associated controller when two access request signals do not compete. When the two access request signals compete for the memory 11, the access enabling signal is supplied to the external controller 14 first because it has the higher priority, and the access disabling signal is supplied to the main controller because it has the lower priority. In other words, information about the priority of the controller is preset in the arbitration circuit 25. The arbitration circuit 25 supplies the access information from the access-enabled first or second bus access controller 23 or 24 to the memory controller 26.

The memory controller 26 controls the transfer of read data to the data buffer 20 from the SDRAM 11 and the transfer of write data to the SDRAM 11 from the data buffer 20 in accordance with the specific access information.

Returning again to FIG. 3, the main controller 13 controls the entire system of the digital still camera 100. The main controller 13 includes a CPU 13a for executing the image processing and other operation processing in accordance with a control program, a ROM 3b for storing the control program, and a RAM 13c for temporarily storing the operation results and other various data of the CPU 13a. The main controller 13 drives and controls the CCD (charge-coupled device) 32 via the external controller 14 in response to an "on" signal from the shutter switch 31. The main controller 13 further writes the non-wait mode data (logical value "1") to the first register 21 in response to the shutter switch 31 "on" signal.

The external controller 14 includes a CPU 14a for executing data storage processing and other operation processing in accordance with its control program, a ROM 14b for storing its control program, and a RAM 14c for temporarily storing the operation results and processing data of the CPU 14a. The external controller 14, in response to the on signal of the shutter switch 31, encodes a pixel signal from the CCD and transfers coded data to the SDRAM 11. The external controller 14 further supples a processing completion signal to the main controller 13. The main controller 13 rewrites the data of the first register 21 to the wait mode (logical value "0") in response to the completion signal from the external controller 14.

The external controller 14 supplies a write signal WR to the second bus access controller 24 of the SDRAM controller 12 via the CPU bus 16 for write instruction processing including a burst write instruction processing. The external controller 14 further supplies a read signal RD to the second bus access controller 24 via the CPU bus 16 for read instruction processing, including burst read processing. At this time, since the external controller 14 has a higher priority than the main controller 13, the controller 14 preferentially accesses the SDRAM 11 and writes or reads data if the access request competes.

The mode setting switch 33 is used for setting the mode data stored in the first register 21. When the mode setting switch 33 is set in the non-wait mode, the main controller 13 receives the mode setting signal from the switch 33 and writes the non-wait mode data "1" to the first register 21 regardless of the operation of the shutter switch 31. When the setting of the mode setting switch 33 changes to the wait mode, the main controller 13 writes the wait mode data "0" to the first register 21 in accordance with the operation of the shutter switch 31.

The main controller 13 receives a coded image data signal from the SDRAM 11 and performs processing of the image data signal and other operation processing. The main controller 13 supplies the write signal WR to the first bus access controller 23 via the CPU bus 15 in accordance with the control program for write instruction processing. The main controller 13 further supplies the read signal RD to the first bus access controller 23 via the CPU bus 15 in accordance with the control program for read instruction processing.

In the non-wait mode in which the bus wait signal high is output from the first bus access controller 23 at any time, the main controller 13 requests access from the SDRAM controller 12 and receives the operating status data from the second register 22.

The main controller 13 executes the instruction processing that follows the write instruction processing or read instruction processing in accordance with the control program when the operating status data is "1". Conversely, the main controller 13 jumps to other processing, which is different from a series of instruction processing that follows the write instruction processing or read instruction processing, and executes the processing of the jump destination when the operating status data is "0". For example, assume there is a first read instruction processing for transferring the read data from the SDRAM 11 to the data buffer 20 and a second read instruction processing for transferring the read data from the data buffer 20 to the main controller 13. In this case, the main controller 13 stops the second read instruction processing and jumps to other processing.

After the processes of the jump destination have been completed, the main controller 13 polls the operating status data stored in the second register 22 or whenever a predetermined number of instructions is completed or a predetermined time period is passed and re-executes the next processing when the operating status data is kept at "0". Conversely, when the operating status data is rewritten from "0" to "1", the main controller 13 executes the stopped instruction processing (for example, the second read instruction processing).

As described above, when data is transferred between the external controller 14 and the SDRAM 11 in the non-wait mode, the main controller 13 executes other processing and checks the data transfer status at predetermined intervals. Accordingly, since the main controller 13 executes the other processing even when access priority is given to the external controller 14, it is prevented from entering the bus locked state.

In the wait mode, the main controller 13 executes the instruction processing that follows the write instruction processing or read instruction processing in accordance with the bus wait signal RDY high from the first bus access controller 23. The main controller 13 further stops the write instruction processing or read instruction processing in accordance with the bus wait signal RDY low from the first bus access controller 23 and holds the wait state until the bus wait signal RDY high is supplied.

Next, the operation of the SDRAM controller 12 is described. Hereupon, assume the first bus access controller 23 is in the non-wait mode, and the access request from the main controller 13 and that from the external controller 14 are competing for the memory 11. Further, assume the main controller 13 supplies its access information (read signal and address data) to the first bus access controller 23, and the external controller 14 supplies its access information (write signal WR and address data) to the second bus access controller 24.

The first and second bus controllers 23 and 24 hold the access information and supply access request signals to the arbitration circuit 25. The first bus controller 23, in the non-wait mode, supplies the bus wait signal RDY high to the main controller 13, and the second bus access controller 24 supplies the bus wait signal RDY low to the external controller 14.

The arbitration circuit 25 supplies the access enabling signal to the second bus access controller 24 to give access authority to the external controller 14 in response to the access request signals and supplies the access disabling signal to the first bus access controller 23 to set the main controller 13 in the wait state.

The second bus access controller 24 supplies the access information to the memory controller 26 via the arbitration circuit 25 in response to the access enabling signal and supplies the bus wait signal RDY high to the external controller 14. The memory controller 26 writes the write data to the SDRAM 11 in accordance with the write signal WR and address data from the external controller 14. At this time, the data buffer 20 stores the operating status data "0" in the second register 22 substantially simultaneously with the start of the data transfer to the SDRAM 11. The external controller 14 supplies the write data to the data buffer 20 in response to the bus wait signal RDY high.

Figure 5:
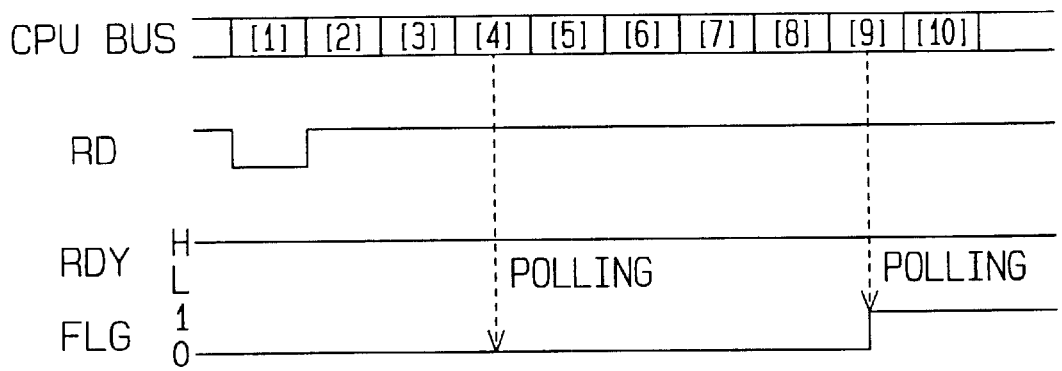
FIG. 5 is a timing chart explaining the operation of the SDRAM controller and microcontroller of FIGS. 3 and 4.

The first bus access controller 23 holds the access information in accordance with the access disabling signal and holds the output of the bus wait signal RDY high. The main controller 13 identifies that the data of the external controller 14 has been transferred based on the operating status data "0" stored in the second register 22 and identifies that it is set in the non-wait mode based on the bus wait signal RDY high. The main controller 13 stops the read instruction processing and jumps to other processing to execute the other processing of the jump destination. The main controller 13 executes other processing until the operating status data stored in the second register 22 is set to "1". For example, in the polling shown in FIG. 5 by polling [4], since the operating status data is "1", the main controller 13 executes other processing [5], [6], . . . [8]. Thus, the main controller 13 having the lower priority executes other processing when access authority is given to the external controller 14.

The arbitration circuit 25 supplies the access enabling signal to the first access controller 23 in response to the access termination signal supplied from the external controller 14 and the access request signal from the first bus access controller 23. The first bus access controller 23 supplies its access information to the memory controller 26 via the arbitration circuit 25 in response to the access enabling signal. The memory controller 26 reads data from the SDRAM 11 and transfers the read data to the data buffer 20 in accordance with the read signal RD and address data from the main controller 13. The data buffer 20 stores the operating status data "0" in the second register 22. The main controller 13, via the polling step [9] shown in FIG. 5, identifies that the operating status data is "1" and executes the read instruction processing (read instruction to data buffer [10] of FIG. 5) for transferring the read data from the data buffer 20 to the main controller 13.

In the first embodiment of the present invention, when the first bus access controller 23 enters the non-wait mode according to the non-wait mode data SEL "1" stored in the first register 21, the first bus access controller 23 supplies the bus wait signal RDY high to the main controller 13. Accordingly, the main controller 13 enters the non-wait state and executes other processing when the external controller 14 accesses the SDRAM 11. The main controller 13 further determines whether an access to the SDRAM is enabled based on the operating status data stored in the second register 22.

In the first embodiment, the main controller 13 sets the wait mode data or non-wait mode data in the first register 21. Accordingly, the SDRAM controller 12 supplies the mode signal that corresponds to the wait mode data or non-wait mode data to the main controller 13. Accordingly, the main controller 13 enters the wait state (stops the instruction processing) or executes other processing in accordance with the mode signal when access to the SDRAM 11 is disabled. This allows the main controller 13 to selectively execute processing.

Figure 6:
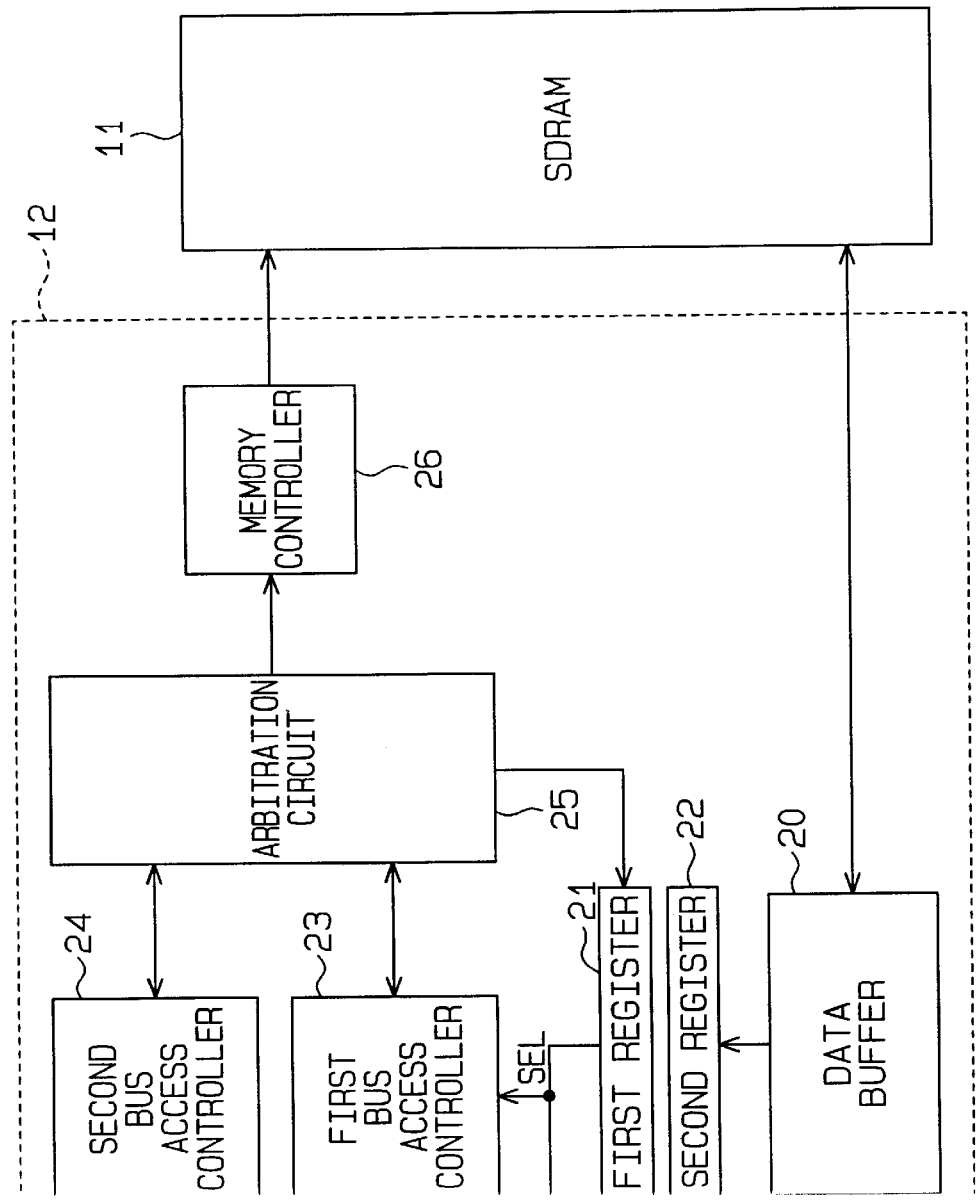
FIG. 6 is a schematic block diagram of an SDRAM controller according to a second embodiment of the present invention.

FIG. 6 is a schematic block diagram of the SDRAM controller 12 according to a second embodiment of the present invention. In the second embodiment, the arbitration circuit 25 is directly connected to the first register 21 and writes the wait mode data or non-wait mode data to the first register 21. For example, when access authority is given to the external controller 14, the arbitration circuit 25 writes the non-wait mode data to the first register 21. The non-wait mode data stored in the first register is supplied to the first bus access controller 23 and the main controller 13. The main controller 13 executes other processing in accordance with the non-wait mode data and the operating status data.

It should be apparent to those skilled in the art that the present invention may be embodied in many other specific forms without departing from the spirit or scope of the invention. Particularly, it should be understood that the invention may be embodied in the following forms.

The external controller 14 may write the mode data to the first register 21 instead of the main controller 13 or the arbitration circuit 25.

The present invention may be applied to the SDRAM controller 12 for arbitrating access from three or more controllers. In this case, it is preferable that the first register 21 be provided for each controller excluding the controller having the highest priority. However, the first register may be provided only for the controller having the lowest priority or for a specific controller.

When the main controller 13 is fixed in the non-wait mode, the first bus access controller 23 receives the access disabling signal from the arbitration circuit 25 and supples the bus wait signal RDY high to the main controller 13 in response to the access disabling signal. In this case, the first register 21 becomes unnecessary.

The data buffer 20 may be provided for the main and external controllers 13 and 14, respectively. Further, a data buffer may be provided for the controller having the higher priority.

The arbitration circuit 25, the main controller 26, or the SDRAM 11 may store the operating status data in the second register 22 instead of the data buffer 20.

In the first and second embodiments, the main controller 13 identifies the operating status data stored in the second register 22 by polling. Alternatively, when the operating status data is switched from "0" to "1", a circuit for supplying an interrupt signal to the main controller 13 may be provided in the SDRAM controller 12. The main controller 13 executes the stopped processing (for example, the transfer processing of read data from the data buffer 20 to the main controller 13) in response to the interrupt signal.

The present invention may be applied to the bus controller used in other electronic devices, such as digital video cameras, DVDs (digital video disks), and color copiers.

Therefore, the present examples and embodiments are to be considered as illustrative and not restrictive and the invention is not to be limited to the details given herein, but may be modified within the scope and equivalence of the appended claims.

What is claimed is:

1. A method for arbitrating access requests to a shared memory from a plurality of controllers including a first controller and a second controller having a lower access priority than the first controller, the method comprising:

setting an operation mode of the second controller in one of a wait mode and a non-wait mode;

deciding the access enabling of the first controller and deciding the access disabling of the second controller in accordance with an access priority when a first access request and a second access request from the first and second controllers compete with each other; and supplying a first signal for resetting a wait state for the first controller; and supplying a second signal for resetting a wait state for the second controller such that the second controller executes other processing when the second controller is set in the non-wait mode and the access to the shared memory by the second controller is disabled.

2. The method of claim 1, further comprising:

supplying a third signal indicating the current access status of the first controller to the second controller.

3. A bus controller for arbitrating access requests to a shared memory from a plurality of controllers including a first controller and a second controller having a lower access priority than the first controller, the bus controller comprising:

a first register for storing one of wait mode data and non-wait mode data set for the second controller;

an arbitration circuit, connected to the first and second controllers for receiving access requests from the first and second controllers, and for deciding the access enabling of the first controller and deciding the access disabling of the second controller when the access requests from the first and second controllers compete with each other;

a first bus access controller, connected to the arbitration circuit, for supplying a first signal for resetting the wait state of the first controller in accordance with the decision of the access enabling of the first controller; and a second bus access controller, connected to the first register and the arbitration circuit, for supplying a second signal for resetting the wait state of the second controller when the access disabling of the second controller is determined and the non-wait mode data is stored in the first register.

4. The controller of claim 3, further comprising:

a data buffer, connected to at least the first controller, for temporarily holding data transferred between at least the first controller and the shared memory and generating access status data indicating the access status of the first controller to the shared memory; and a second register, connected to the data buffer and the second controller, for temporarily storing the access status data.

5. The controller of claim 3, wherein the second controller generates one of the wait mode data and the non-wait mode data stored in the first register.

6. An electronic device, comprising:

a plurality of controllers including first and second controllers;

a memory shared by the plurality of controllers, wherein the second controller has a lower access priority than the first controller; and a bus controller, connected between the plurality of controllers and the memory, for arbitrating access requests to the shared memory from the plurality of controllers, the bus controller including, a first register for storing one of wait mode data and non-wait mode data set for the second controller, an arbitration circuit, connected to the plurality of controllers for receiving access requests from the first and second controllers, and for deciding the access enabling of the first controller and access disabling of the second controller when the access requests from the first and second controllers compete with each other, a first bus access controller, connected to the arbitration circuit, for supplying a first signal for resetting a wait state of the first controller in accordance with the decision of the access enabling of the first controller, and a second bus access controller, connected to the first register and the arbitration circuit, for supplying a second signal for resetting the wait state of the second controller when the access disabling to the second controller is determined and the non-wait mode data is stored in the first register.

7. The device of claim 6, wherein the bus controller further includes:

a data buffer, connected to at least the first controller, for temporarily holding data transferred between at least the first controller and the shared memory and generating access status data indicating the access status of the first controller to the shared memory; and a second register, connected to the data buffer and the second controller, for temporarily storing the access status data.

8. The device of claim 7, wherein the second controller generates one of the wait mode data and the non-wait mode data stored in the first register.

* * * * *